May 18, 1943.  D. C. WHITE  2,319,569
METHOD AND MEANS FOR MEASURING PROFILES AND CONTOURS
Filed Jan. 15, 1942  2 Sheets-Sheet 1

Inventor
Dennis C. White,
By McMorrow & Berwall
Attorneys

May 18, 1943 D. C. WHITE 2,319,569
METHOD AND MEANS FOR MEASURING PROFILES AND CONTOURS
Filed Jan. 15, 1942 2 Sheets-Sheet 2
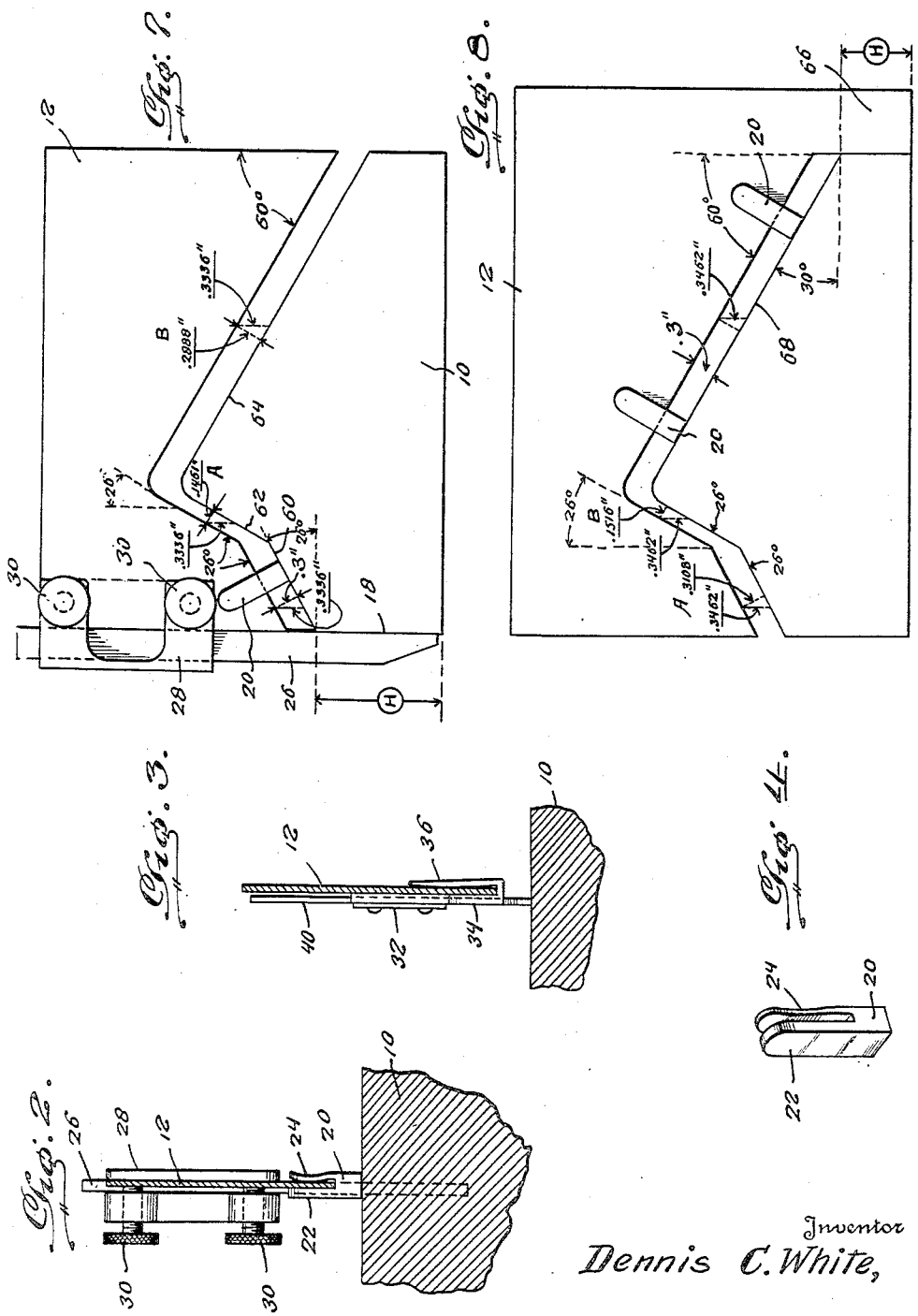
Inventor
Dennis C. White,
By McMorrow & Berman
Attorneys Patented May 18, 1943

2,319,569

UNITED STATES PATENT OFFICE 2,319,569

METHOD AND MEANS FOR MEASURING PROFILES AND CONTOURS

Dennis C. White, Akron, Ohio

Application January 15, 1942, Serial No. 426,912

10 Claims. (Cl. 33—174)

This invention relates to a method and means for measuring profiles of irregular surfaces and more particularly, angularly related, planar surfaces.

One object of the invention is to provide a method and means for measuring the profiles of angularly related or disposed surfaces, particularly to determine the amount of material which must be additionally removed from any given surface in order to have said surface conform to a desired pattern as determined by a template.

Another object of the invention is to provide a method and means for measuring the profile of angularly related or disposed surfaces while forming the same by computing, by trigonometric functions of angles at which said surfaces are disposed with respect to a common base line, the distance any individual surface should be with respect to a corresponding edge on a template.

Other objects of the invention as well as the characteristics thereof will become apparent from considering the following specification, together with the accompanying drawings forming a part thereof and in which—

Figure 1 is a front elevation showing an irregular surface being measured by the method and apparatus forming the instant invention.

Figure 2 is a sectional side elevation taken on the line 2—2 of Figure 1.

Figure 3 is a sectional side elevation taken on the line 3—3 of Figure 1.

Figure 4 is a perspective view of a gauge block forming part of the measuring means of the instant invention.

Figure 5 is a rear elevation of the measuring device comprising part of the instant invention.

Figure 6 is a section plan view on line 6—6 of Figure 5.

Figure 7 is a front elevation similar to Figure 1 but showing a modified use of the measuring means.

Figure 8 is a view similar to Figure 7 but showing a modified form of template.

In forming irregular and angularly related surfaces on objects such as dies, machine tool beds and other parts having guides and guideways, and the like, it has heretofore been customary to use a template having a shape complementary to that desired on the object and, by making numerous cuts on the surfaces and repeatedly trying the template thereon many times, the finished surface was finally produced, entirely by the "cut and try" method. It will be appreciated by those skilled in the art that forming a composite surface having a plurality of angularly related surfaces by the foregoing method is exceedingly time consuming, tedious, and requires skilled mechanics to perform the same. To become skilled in this trade requires many years of training and only a relatively small percentage of those starting to learn the trade actually become proficient in it.

Training mechanics to perform this type of work is expensive to a shop owner since many pieces of work are ruined while learning and the rate of production of the apprentice is very low. If the apprentice does not develop into a skilled mechanic, the expense of trying to train him is largely lost.

By the applicant's method and by using the equipment comprising part of the instant invention, a far less degree of skill is required to produce accurately formed surfaces and anyone with only the slightest aptitude for working with machine tools and having a slight knowledge of trigonometry can produce satisfactory results.

Basicly, the applicant's method and means for measuring contours and profiles comprises forming one or more planar surfaces on an object to be provided with a desired contour to serve as base or standard surfaces, placing one or more spacing members of known dimension on a template of the proper shape, placing the assembled template and spacing members on the object with the spacing members in contact with the standard surfaces formed on the object, computing the perpendicular distance between each individual edge of the template and the corresponding surface to be formed on the object by multiplying the proper trigonometric function of the angle of each surface with respect to a common surface or line for all surfaces with the known dimension of the spacing blocks, and cutting each planar surface on the proper angle until the proper perpendicular distance between the template edge and surface is reached. After all surfaces have been similarly formed, the template will fit the finished contour perfectly. Afterward, the proper finish may be given the fillets and ridges between the surfaces.

Referring to the drawings, and for purposes of a concrete example of an application of the applicant's method, assume in Figure 1, that the bed 10 of a lathe, for example, is to be formed. The template 12 has the desired contour comprising angularly related edges 14. A plurality of standard surfaces 16 are formed on the bed 10 and on which all measurements made from the template are based.

At least one side 18 of the bed is finished to also serve as a base or standard side. Spacing blocks or members 20, shown in detail in Figure 4, are formed with a solid base portion of known heighth and projecting upward therefrom is a pair of spaced fingers 22 and 24, the latter being preferably resilient and flared outward at the top to facilitate the reception of the template 12 between the fingers and into engagement with the base of the channel which constitutes the top of the base portion. The resilient finger 24 cooperates with the finger 22 to detachably hold the spacing members on the template.

An endwise aligning member or stop 26 is preferably detachably and adjustably secured to one end of the template in a suitably channeled guideway 28 shown clamped to the template end by a pair of thumb screws 30. The member 26 is adapted to abut the finished side 18 of the bed to place the template in the same relative transverse position on the bed each time the template is placed thereon for a trial measurement.

A distance measuring means generally indicated at 32 is provided with a channel shaped body 34 having a wing or plate 36, preferably resilient, bent upward and chamfered at the upper end to facilitate the reception of the template in the base of the channel which, in effect, serves as a guide rib for the template. The face of body 34 opposite plate 36 is provided with a groove 38, Figure 6, the longitudinal axis of which is substantially perpendicular to the base of the channel of body 34.

Slidably disposed in the groove 38 is a scale or measuring member 40, calibrated similarly to a ruler, one end of the member being beveled along one edge to provide a surface engaging end 42. A member 44, partially overlying the channel 38, is secured to the body 34 by suitable rivets or screws and is provided with a finger 46 adapted to resiliently engage the measuring member 40 and hold the same in any desired position in the channel 38.

Fastened to the body 34 on the opposite side of the channel 38, by suitable rivets or screws, is a vernier 48, preferably formed with a beveled edge adjacent the vernier calibrations. The vernier and measuring member are suitably calibrated whereby measurements may be accurately read to one-thousandth of an inch. The measuring member and vernier read zero when the end 42 is even with the inside surface of the base of the channel in body 34.

Assume, as a practical problem, the bed 10 is to be formed with seven angularly related planar surfaces labeled 50 through 56 inclusive. Vertical side 58 of the bed, or any line perpendicular thereto, will be taken as a base line from which to measure the angles of the surfaces to be formed on the bed.

Surface 50 is to be at 75° to the vertical side 58; surface 51 at 20°; surface 52 at 45°; surface 53 at 60°; surface 54 at 30°; surface 55 at 25°; and surface 56 at 65°. The known and fixed dimension of spacing members 20 is taken as $\frac{3}{10}$ of one inch, for example, but any other dimension may be used.

To compute the perpendicular distance between surface 50 and the corresponding edge of the template and designated A in Figure 1, the proper trigonometric function of the angle of 75°, the sine, which is .965, is multiplied by .3 inch, resulting in .2895 inch which is dimension A. Knowing this, the milling machine, planer, shaper, or whatever machine is used to form the bed, is set to cut the surface 50 at 75° to the vertical side of the bed and, when the template is placed on the bed with spacing members 20 on standard surfaces 16, and the reading of the measuring member 40 is .2895 inch, the cutting may be stopped since the surface 50 is finished.

This procedure is repeated for each individual surface as, in the case of surface 51, the sine of 20° is .342. Multiplying this by .3 inch, the measurement .1026 inch is obtained to give dimension B. The respective sines of the remaining angles of 45°, 60°, 30°, 25°, and 65° are multiplied by .3 inch to produce the dimensions C, D, E, F, and G which, it develops, are respectively .2121 inch, .2598 inch, .15 inch, .1266 inch, and .2718 inch.

In the foregoing illustrations of applications of the method comprising the instant invention, the standard surfaces 16 are at right angles to the sides 18 and 58. In situations where no surfaces are to be formed at right angles to a vertical face on the object, the method is equally applicable. For example, referring to Figure 7, the object may be a coining die 10. The vertical side 18 is machined thereon. The surface 60 is machined at the desired angle of 64° to the vertical or 26° to the horizontal. It is desired to establish a basic, standard vertical dimension between the surface 60 and the corresponding edge of the template. The perpendicular distance between this surface and template edge is known to be .3 inch. To determine the dimension parallel to side 18, the cosecant of 64° or 1.112 is used to multiply .3 inch, resulting in .3336 inch which is now to serve as the basic dimension for computing the remaining dimensions A and B on Figure 8. Thus, using the same principles as above described in connection with the dimensions of Figure 1, since surface 62 in Figure 7 is at 26° with the vertical, the sine of 26°, or .438, multiplied by .3336 inch, gives .1461 inch which is dimension A. Similarly, since surface 64 is at an angle of 60° to the vertical, sine 60°, or .866, multiplied by .3336 inch gives .2888 inch as dimension B.

By placing the template, spacing member and stop member on the object 10 as shown in Figure 7, the dimensions A and B may readily be measured by measuring means 32, described above.

If desired, the template may be formed with an integral stop or aligning means 66, shown in Figure 8. In this example of a slightly different embodiment of the present invention, two spacing members 20 are placed on edge of the template 12. The surface 68, which is to be at 60° to the vertical, or 30° to the horizontal, is first machined. To find the basic, vertical spacing dimension, as in the example relating to Figure 7, the cosecant of 60°, or 1.154 is multiplied by the fixed dimension .3 inch, resulting in .3462 inch which shall be the standard vertical distance between any two vertically spaced positions on the surfaces and corresponding template edge.

Computing dimension A of Figure 8; sine 64°, or .898, multiplied by .3462, gives .3108 inch for dimension A. Similarly, dimension B equals the sine of 26°, or .438, multiplied by .3462 inch, to give .1516 inch.

It will thus be seen that the invention affords a wide variety of possibilities for forming irregular and angularly related surfaces on an object with accuracy and expedition. The continuous "cut and try" method used at present for forming such surfaces is substantially eliminated since the amount of "trying" with the template required in the process of the present invention is practically negligible when compared with the formerly used method. Novices may employ the present method and means for accomplishing the same to produce highly satisfactory results with little or no prior experience. All that is necessary is only the slightest knowledge of trigonometry.

While the foregoing method and means constitute the preferred embodiments of my invention, the same are not to be regarded as restrictive, but only illustrative, since the invention has other applications which will be apparent to those skilled in the art.

I claim as my invention:

1. Means for measuring the amount of material to be removed from a surface to conform it to a template edge, comprising a template, means attachable to said template comprising a spacing member of known dimension, and a distance measuring member having a surface engaging portion and a template edge engaging means adapted to maintain the line of measurement of said measuring member perpendicular to said template edge whereby the perpendicular distance between said template edge and surface may be measured in relation to the known dimension of said spacing member.

2. Means for measuring the amount of material to be removed from an object to form various angularly related surfaces on said object, comprising a template having a plurality of angularly related edges, a plurality of spacing members of known dimension attachable to said template and respectively engageable with guide surfaces on said object to space the template a known distance from the guide surfaces on said object, a member having a template edge engaging means and a guideway perpendicular to said template edge engaging means, and a distance measuring element slidably mounted in said guideway and having a surface engaging portion adapted to abut the surface being formed whereby the perpendicular distance between said surface and corresponding template edge may be measured in relationship to the known dimension of said spacing members.

3. Means for measuring the amount of material to be removed from an object to form various angularly related surfaces on said object, comprising a template having a plurality of angularly related edges, a plurality of spacing members each having spaced means thereon adapted to engage opposite surfaces of said template and one of said means being resiliently urged toward the other means, said spacing members being adapted to be attached to said template at spaced positions thereon and respectively engageable with guide surfaces on said object to space the template a known distance from the guide surfaces on said object, a member having a template edge engaging means and a guideway perpendicular to said template edge engaging means, and a distance measuring element slidably mounted in said guideway and having a surface engaging portion adapted to abut the surface being formed whereby the perpendicular distance between said surface and corresponding template edge may be measured in relationship to the known dimension of said spacing members.

4. Means for measuring the amount of material to be removed from an object to form various angularly related surfaces on said object, comprising a template having a plurality of angularly related edges, a plurality of spacing members of known dimension attachable to said template and respectively engageable with guide surfaces on said object to space the template a known distance from the guide surfaces on said object, a member having a template edge engaging means and a guideway perpendicular to said template edge engaging means, a distance measuring element slidably mounted in said guideway and having a surface engaging portion adapted to abut the surface being formed whereby the perpendicular distance between said surface and corresponding template edge may be measured in relationship to the known dimension of said spacing members, and aligning means carried by said template and adapted to engage a side of said object to properly and identically align the template transversely therewith during repeated placements of the template on the object following various work operations on the object and while measuring the respective surfaces.

5. Means for measuring the amount of material to be removed from an object to form various angularly related surfaces on said object, comprising a template having a plurality of angularly related edges, a plurality of spacing members of known dimension attachable to said template and respectively engageable with guide surfaces on said object to space the template a known distance from the guide surfaces on said object, a member having a template edge engaging means and a guideway perpendicular to said template edge engaging means, a distance measuring element slidably mounted in said guideway and having a surface engaging portion adapted to abut the surface being formed whereby the perpendicular distance between said surface and corresponding template edge may be measured in relationship to the known dimension of said spacing members, and aligning means detachably and adjustably carried by said template adjacent one end thereof and adapted to engage a side of said object to properly and identically align the template transversely therewith during repeated placements of the template on the object following various work operations on the object and while measuring the respective surfaces.

6. Means for measuring the amount of material to be removed from an object to form various angularly related surfaces on said object, comprising a template having a plurality of angularly related edges, a plurality of spacing members each having spaced means thereon adapted to engage opposite surfaces of said template and one of said means being resiliently urged toward the other means, said spacing members being adapted to be attached to said template at spaced positions thereon and respectively engageable with guide surfaces on said object to space the template a known distance from the guide surfaces on said object, a member having a template edge engaging means and a guideway perpendicular to said template edge engaging means, a distance measuring element slidably mounted in said guideway and having a surface engaging portion adapted to abut the surface being formed whereby the perpendicular distance between said surface and corresponding template edge may be measured in relationship to the known dimension of said spacing members, and aligning means detachably and adjustably carried by said template adjacent one end thereof and adapted to engage a side of said object to properly and identically align the template transversely therewith during repeated placements of the template on the object following various work operations on the object and while measuring the respective surfaces.

7. Means for measuring the amount of material to be removed from an object to form various angularly related surfaces on said object, comprising a template having a plurality of angularly related edges, a plurality of spacing members of known dimension attachable to said template and respectively engageable with guide surfaces on said object to space the template a known distance from the guide surfaces on said object, and measuring means comprising a guide rib adapted to engage an edge of said template and be maintained parallel thereto and a guide channel extending perpendicular to said guide rib and slidably supporting therein a measuring element having a surface engaging end whereby the measuring element is adapted to measure the perpendicular distance between a given surface on said object and corresponding template edge in relationship to the known dimension of said spacing members.

8. Means for measuring the amount of material to be removed from an object to form various angularly related surfaces on said object, comprising a template having a plurality of angularly related edges, a plurality of spacing members of known dimension attachable to said template and respectively engageable with guide surfaces on said object to space the template a known distance from the guide surfaces on said object, and measuring means comprising a channel shaped member having one side resiliently urged toward the other and adapted to receive and yieldably clamp the template therebetween with the base of the channel engaging an edge of the template for alignment therewith, said channel shaped member also having a guideway formed therein perpendicular to said base of said channel, and a calibrated measuring element slidably disposed in said guideway and having an end adapted to abut a surface on said object to measure the perpendicular distance between said surface and the corresponding edge of said template in relationship to the known dimension of said spacing elements.

9. Means for measuring the amount of material to be removed from an object to form various angularly related surfaces on said object, comprising a template having a plurality of angularly related edges, a plurality of spacing members of known dimension attachable to said template and respectively engageable with guide surfaces on said object to space the template a known distance from the guide surfaces on said object, measuring means comprising a channel shaped member having one side resiliently urged toward the other and adapted to receive and yieldably clamp the template therebetween with the base of the channel engaging an edge of the template for alignment therewith, said channel shaped member also having a guideway formed therein perpendicular to said base of said channel, a calibrated measuring element slidably disposed in said guideway and having an end adapted to abut a surface on said object to measure the perpendicular distance between said surface and the corresponding edge of said template in relationship to the known dimension of said spacing elements, and aligning means carried by said template and adapted to engage a side of said object to properly and identically align the template transversely therewith during repeated placements of the template on the object following various work operations on the object and while measuring the respective surfaces.

10. Means for measuring the amount of material to be removed from an object to form various angularly related surfaces on said object, comprising a template having a plurality of angularly related edges, a plurality of spacing members of known dimension attachable to said template and respectively engageable with guide surfaces on said object to space the template a known distance from the guide surfaces on said object, measuring means comprising a channel shaped member having one side resiliently urged toward the other and adapted to receive and yieldably clamp the template therebetween with the base of the channel engaging an edge of the template for alignment therewith, said channel shaped member also having a guideway formed therein perpendicular to said base of said channel, a calibrated measuring element slidably disposed in said guideway and having an end adapted to abut a surface on said object to measure the perpendicular distance between said surface and the corresponding edge of said template in relationship to the known dimension of said spacing elements, and aligning means detachably and adjustably carried by said template adjacent one end thereof and adapted to engage a side of said object to properly and identically align the template transversely therewith during repeated placements of the template on the object following various work operations on the object and while measuring the respective surfaces.

DENNIS C. WHITE.